(12) United States Patent
Khalifa et al.

(10) Patent No.: US 11,306,009 B2
(45) Date of Patent: Apr. 19, 2022

(54) MEMBRANE DISTILLATION DEVICE WITH BUBBLE COLUMN DEHUMIDIFIER

(71) Applicant: KING FAHD UNIVERSITY OF PETROLEUM AND MINERALS, Dhahran (SA)

(72) Inventors: Atia Esmaeil Khalifa, Dhahran (SA); Mohamed A. Antar, Dhahran (SA); Suhaib M. Alawad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 179 days.

(21) Appl. No.: 16/137,018

(22) Filed: Sep. 20, 2018

(65) Prior Publication Data
US 2020/0095138 A1   Mar. 26, 2020

(51) Int. Cl.
*B01D 61/36* (2006.01)
*C02F 1/44* (2006.01)
(Continued)

(52) U.S. Cl.
CPC .............. *C02F 1/447* (2013.01); *B01D 3/16* (2013.01); *B01D 61/364* (2013.01);
(Continued)

(58) Field of Classification Search
CPC .... B01D 61/36; B01D 61/364; B01D 61/366; B01D 61/368; B01D 1/14; B01D 5/003
See application file for complete search history.

(56) References Cited

U.S. PATENT DOCUMENTS 3,477,917 A * 11/1969 Rodgers ............... B01D 61/364
                                                     203/10
6,716,355 B1   4/2004 Hanemaaijer et al.
(Continued)

FOREIGN PATENT DOCUMENTS

CN        105636661 B    2/2018
CN        107720863 A    2/2018
(Continued)

OTHER PUBLICATIONS

Rasha B. Saffarini, et al., "Technical evaluation of stand-alone solar powered membrane distillation systems", Desalination, vol. 286, 2012, pp. 332-341.

*Primary Examiner* — Jonathan Luke Pilcher
(74) *Attorney, Agent, or Firm* — Oblon, McClelland, Maier & Neustadt, L.L.P.

(57) ABSTRACT

A desalination device may comprise: a membrane distillation module comprising a water feed chamber, a carrier gas (CG) chamber, and a hydrophobic microporous membrane configured to separate the water feed chamber and the CG chamber; and a bubble column dehumidifier comprising a bubble column inlet, a bubble column gas outlet, and a product outlet, wherein the MD module allows water vapor to translocate to the CG chamber, but not liquid water, and wherein the water feed each chamber has comprises a water feed inlet and a water feed outlet, wherein the CG chamber comprises a CG chamber inlet and CG chamber outlet, wherein the CG chamber outlet is upstream of and connected to the bubble column dehumidifier, and wherein the CG chamber inlet is downstream of and connected to the bubble column dehumidifier so as to cycle a carrier gas through the CG chamber and the bubble column dehumidifier.

18 Claims, 12 Drawing Sheets

(51) Int. Cl.
   *B01D 3/16*   (2006.01)
   *C02F 103/08*   (2006.01)
(52) U.S. Cl.
   CPC ........ *B01D 61/366* (2013.01); *B01D 2313/26* (2013.01); *B01D 2313/90* (2013.01); *C02F 2103/08* (2013.01); *C02F 2201/002* (2013.01)

(56) References Cited

U.S. PATENT DOCUMENTS

| | | |
|---|---|---|
| 8,029,675 B2 | 10/2011 | Heinzl |
| 8,409,324 B1 | 4/2013 | Straub et al. |
| 8,523,985 B2 | 9/2013 | Govindan et al. |
| 8,778,065 B2 | 7/2014 | Govindan et al. |
| 9,174,164 B2 | 11/2015 | Glanville et al. |
| 9,556,041 B2 | 1/2017 | Govindan et al. |
| 9,745,208 B2 | 8/2017 | Al-Qutub et al. |
| 9,751,047 B2 | 9/2017 | Lienhard et al. |
| 9,796,601 B1 | 10/2017 | Al-Qutub et al. |
| 2009/0152199 A1 | 6/2009 | Ma et al. |
| 2010/0170776 A1 | 7/2010 | Ehrenberg et al. |
| 2010/0300946 A1* | 12/2010 | Nguyen ................. B01D 71/32 210/149 |
| 2014/0263060 A1 | 9/2014 | Summers et al. |
| 2015/0298997 A1* | 10/2015 | Shimizu ................. C02F 1/447 210/640 |
| 2015/0336053 A1 | 11/2015 | Dow et al. |
| 2017/0014773 A1 | 1/2017 | Swaminathan et al. |

FOREIGN PATENT DOCUMENTS

| | | |
|---|---|---|
| EP | 1 491 506 A1 | 12/2004 |
| KR | 10-1515208 | 3/2015 |
| WO | WO 2014/058309 A1 | 4/2014 |

\* cited by examiner

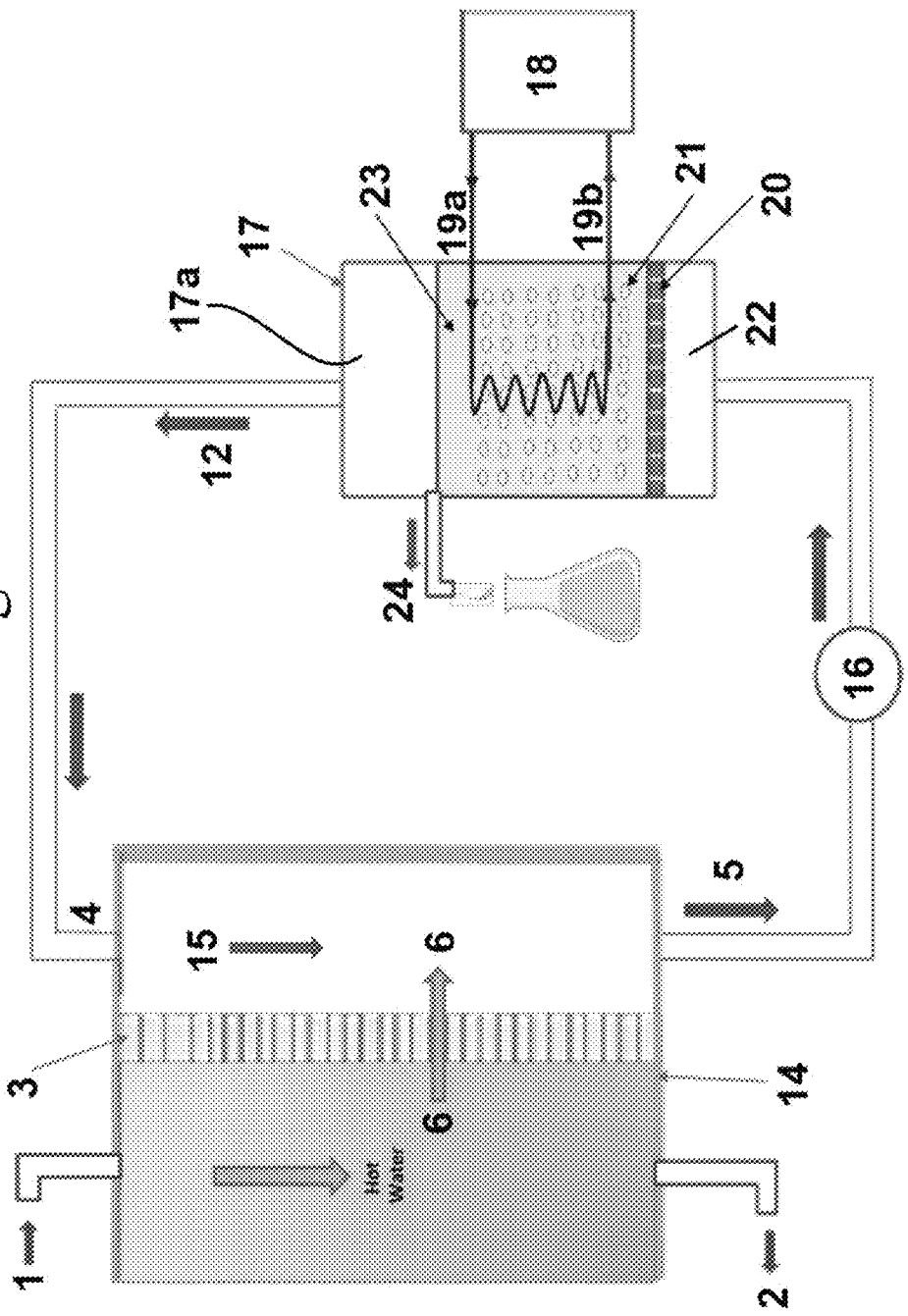

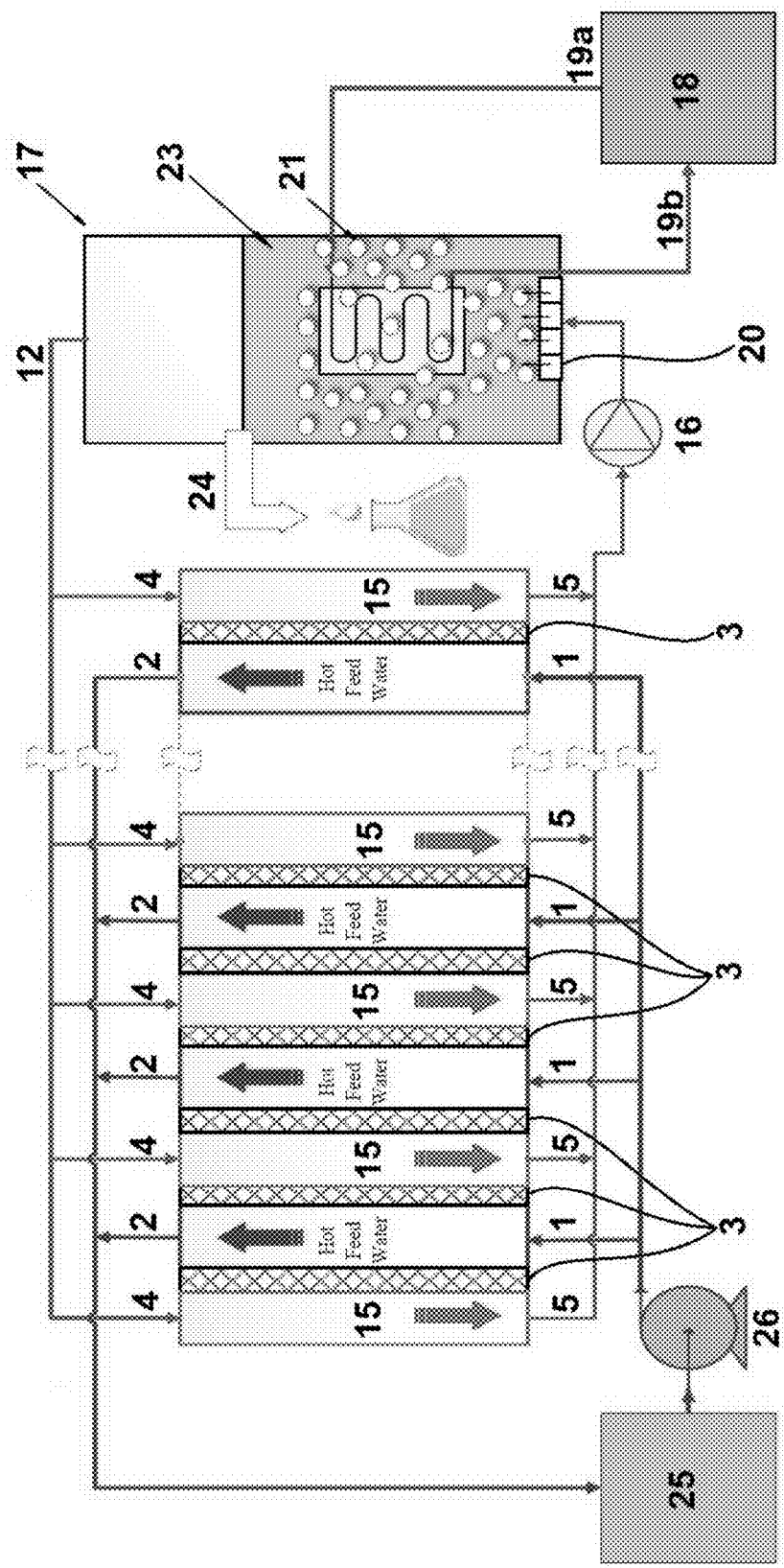

MEMBRANE DISTILLATION DEVICE WITH BUBBLE COLUMN DEHUMIDIFIER

BACKGROUND OF THE INVENTION

Field of the Invention

The present application relates to desalination and desalination devices.

Description of the Related Art

Membrane distillation (MD) for water desalination is a thermally-driven membrane separation technology for separating water vapor from feed water solution. In the MD process, a hot saline feed water is generally passed over a micro-porous hydrophobic membrane. The temperature difference between the two sides of the membrane leads to a vapor pressure difference that causes water vapor in the hot feed side to permeate through the membrane pores. The permeated vapor condenses either in the cold side of the membrane, inside the membrane module, or in an external condenser. Hydrophobicity of the membrane usually keeps the liquid from passing through the pores based on surface tension. MD water desalination processes have attracted increased attention as a potential technology for small-to-medium scale water desalination plants. The technique works at low feed temperatures, e.g., 50 to 90° C., and low pressures, e.g., close to atmospheric, sufficient to create required flow, generally achieving almost 100% salt rejection.

There are four basic configurations of membrane distillation (MD) modules customarily used in the art, namely: direct contact membrane distillation (DCMD), air gap membrane distillation (AGMD), sweeping gas membrane distillation (SGMD), and vacuum Membrane Distillation (VMD), illustrated in FIG. 1A to D. In the known MD configurations, the feed solution is generally in direct contact with the hydrophobic membrane. However, the way the permeated fluid, i.e., "permeate," is condensed (and collected) is different for each of the four configurations.

In DCMD, the hot solution, i.e., the "feed," is in direct contact with the hot membrane side surface and the cold membrane surface is in direct contact with the cold permeate stream. Evaporation in DCMD takes place at the feed-membrane surface interface. Due to the vapor pressure difference across the membrane in DCMD, the vapor is moved across the membrane to the permeate stream side and condenses inside the membrane module. An important drawback of DCMD is the large amount of heat lost by conduction through the thin hydrophobic membrane.

In AGMD, a stagnant air gap is introduced between the membrane and a condensation surface within the membrane module to reduce the conduction heat loss through the membrane, which increases the efficiency of the MD process. However, the vapor in AGMD needs to cross the air barrier, presenting resistance to vapor transfer, and thus the flux is reduced. As the width, i.e., thickness, of the air gap increases in AGMD, the flux decreases. This diminished flux is considered a drawback of AGMD.

In SGMD, an inert gas is used to sweep the vapor at the permeate membrane side to condense outside the membrane module. The gas barrier reduces the heat loss and enhances the mass transfer coefficient due its stream motion. The main disadvantage of SGMD is that a small volume of permeate diffuses in a large sweep gas volume, requiring a large condenser, and the condenser is often outside the membrane module.

In VMD configuration, a vacuum pump is used to create a vacuum in the permeate membrane side. Condensation in VMD takes place outside the membrane module. The heat lost by conduction is negligible in VMD, which is generally considered a great advantage of VMD. However, powering and maintaining the vacuum pump are disadvantages of VMD.

Accordingly, a number of attempts have been made to improve upon known membrane distillation techniques, even while including one or more of the arrangements discussed above.

US 2010/0170776 A1 (Ehrenberg) discloses systems comprising a selective transfer membrane that can be utilized in material separation. The membrane assembly comprises part of a desalination, distillation, liquid purification, and/or heating and cooling system. Ehrenburg's arrangement may include a modified AGMD-VMD-type portion, utilizing a selective transfer membrane which may comprise an ionomeric polymer that is permeable to high dipole materials.

However, while Ehrenburg may disclose a condenser downstream of an MD module, Ehrenberg does not disclose the use of a bubbling column to condense and collect fluid(s), particularly desalinated water, downstream of its MD.

U.S. Pat. No. 9,556,041 (Govindan I) discloses selective scaling in water treatment systems in which desalination is performed. The location of the formation of its solid scale within a water treatment system is controlled by adjusting one or more system parameters, such as the temperature and/or flow velocity of a saline stream within the water treatment system.

However, while Govindan I may disclose a dehumidifier within its desalination system and may separately indicate the possibility of implementing an MD system, Govindan I fails to disclose a bubbling column, much less a bubbling column to condense and collect the desalinated water in its scaling/desalination.

The patent series including U.S. Pat. No. 9,079,117 (US 2015/130093 A1), U.S. Pat. No. 9,364,771 (US 2015/0329377 A1), U.S. Pat. No. 9,468,864 (US 2015/0190731 A1), U.S. Pat. No. 9,700,811 (US 2015/0190730 A1), US 2015/0129410 A1, and CN 105636661 B (Govindan II) discloses condensing apparatuses and their use in various heat and mass exchange systems. Govindan II describes that condensing apparatuses, such as bubble column condensers, may employ a heat exchanger positioned external to the condensing vessel to remove heat from a bubble column condenser outlet stream to produce a heat exchanger outlet stream. The apparatus may also include a cooling device external to the vessel configured to remove heat from the heat exchanger outlet stream to produce a cooling device outlet stream. The apparatus may be configured to include internal features, such as a vapor distribution region and/or a plurality of liquid flow control wires and/or chambers within the apparatus having an aspect ratio of at least 1.5. The apparatus may be coupled with a humidifier in a desalination system.

However, while Govindan II may describe bubble columns and even dehumidifiers in the context of humidification-de-humidification (HDH) systems, in conjunction with desalination, Govindan II is silent with respect to membranes and membrane distillation. Further, in Govindan II's HDH systems, the carrier gas is taught to directly contact the brine.

CN 107720863 A (Du) discloses a slot-type solar sea water desalination device based on membrane distillation in the field of seawater desalination. Heat energy required by seawater distillation in Du comes from solar energy emitted by a slot-type condenser mirror, wherein solar energy is reflected and condensed onto an arc heat collection tube in a membrane assembly, and is used for heating seawater flowing in the tube. After the seawater in the heat collection tube is heated, a vapor pressure difference is formed on two sides of a hydrophobic distillation membrane in the membrane assembly due to temperature difference. Due to the pressure difference, moisture in seawater penetrates through pores of the hydrophobic membrane in a vapor mode, and a vapor stream is formed in the channel on the other side of the hydrophobic membrane. The vapor is condensed to obtain liquid fresh water, and is collected in a fresh water tank.

However, while Du discloses membrane distillation and a condenser downstream of its MD module, Du's system appears to be a customary MD system, failing to disclose the use of bubble condenser with its system.

U.S. Pat. No. 6,716,355 (Hanemaaijer I) discloses purifying a liquid by membrane distillation, in particular to produce desalinated water from seawater or brackish water or process water by: passing a relatively warn vaporizing stream of liquid (retentate stream) over a porous membrane, vapor flowing via the pores of the membrane to the other side of said membrane, and condensing said vapor on a relatively cool condenser surface to give a distillate stream, said condenser surface forming the non-porous separation between, a feed stream to be purified and said distillate steam, which feed stream is in counter-current with the retentate stream so that an appreciable proportion of the latent heat will be transferred via vapor to the feed stream, and a gas gap with a width of less than 5 mm being present between the porous membrane and the condenser surface. In order to improve the distillate flow rate per unit driving force, a pressure which is lower than the atmospheric pressure and higher than the vapor pressure of the feed stream is maintained in the gas gap, the porosity of the porous membrane is higher than 0.7, porosity being understood to be the ratio of the open volume to the total volume of the porous membrane, the surface area of the condenser surface is 1.2 to 6 times, preferably 2 to 3 times, the surface area of the porous membrane, the effective local vapor pressure difference between the retentate seam and the condensing stream is less than 10 kPa (0.1 bar), preferably less, than 5 kPa (0.05 bar) and the perceptible heat of the distillate stream is released by heat exchange to the feed stream and/or the retentate stream, with preference for the retentate stream.

However, while Hanemaaijer I describes membrane distillation systems, Hanemaaijer I fails to disclose a bubbling condenser in conjunction with its system.

The patent series including U.S. Pat. No. 8,287,735 (US 2010/0072135 A1), WO 2008/054207, KR 101505208 B1 (Hanemaaijer II) discloses a method for the purification of a liquid by membrane distillation by: passing a heated vaporizing stream of a liquid (retentate stream) through a retentate channel along a porous hydrophobic membrane, whereby vapor of the liquid flows via the pores of the membrane to the other side of said membrane, and condensing the vapor on the other side of the membrane to give a distillate stream in a distillate channel which distillate is created by passing the heat of condensation (latent heat) towards a condenser surface, the condenser surface forming a non-porous separation between a feed stream of the liquid to be purified and said distillate stream, which feed stream is passed through a feed channel in counter-current with the retentate stream, in which feed channel a space material is arranged whereby at least part of the latent heat is transferred via the condenser surface to the feed stream, and whereby a positive liquid pressure difference is applied between the retentate stream and the feed stream at the corresponding points of the retentate channel and the feed channel over at least a part of each of the retentate channel and feed channel.

However, like Hanemaaijer I, Hanemaaijer II fails to disclose a bubbling condenser in conjunction with its MD system.

*Desalination* 2012, 286, 332-341 (Saffarini) discloses a solar-powered membrane distillation (SP-MD) desalination systems as a promising technology in off-grid areas with strong solar radiation. Saffarini provides a comprehensive review and assessment of established SP-MD systems and to identify common and contrasting features among them. Saffarini focuses mainly on SP-MD systems that had been tested under field conditions for at least several days and which are either fully or partially powered by solar energy. The systems were first reviewed in terms of their physical properties and operating conditions. The systems were then evaluated in terms of several performance indicators, such as membrane flux achieved, energy consumption, gained output ratio (GOR), performance ratio, and the energy recovery scheme applied. A numerical model was constructed and run to evaluate how a key performance indicator, GOR, can be enhanced by certain operating parameters.

However, while Saffarini discloses solar-powered MD systems in a desalination system in which a hot saline feed stream is passed over a microporous hydrophobic membrane, Saffarini fails to disclose a bubbling condenser in conjunction with its MD system nor bubbling the humid gas through desalinated water.

Accordingly, there remains a need in the art for improved methods and systems of desalination.

SUMMARY OF THE INVENTION

Aspects of the invention provide desalination devices, comprising: a membrane distillation module comprising a water feed chamber, a carrier gas chamber, and a hydrophobic microporous membrane configured to separate the water feed chamber and the carrier gas chamber; and a bubble column dehumidifier comprising a bubble column inlet, an extraction material into which carrier gas from the bubble column inlet bubbles, a dehumidifier space above the extraction material, a bubble column gas outlet, and a product outlet, wherein the membrane distillation module can be configured to allow water vapor, i.e., gas, to translocate to the carrier gas chamber, but not liquid water, wherein the water feed chamber comprises an water feed inlet and a water feed outlet, wherein the carrier gas chamber comprises a carrier gas chamber inlet and a carrier gas chamber outlet, wherein the carrier gas chamber outlet is upstream of and connected to the bubble column dehumidifier, and wherein the carrier gas chamber inlet is downstream of and connected to the bubble column dehumidifier so as to cycle a carrier gas through the carrier gas chamber and the bubble column dehumidifier. Any of the modifications to follow, in any permutation, may be applied to such devices, as well as one or more solutions over the background art as described above.

The bubble column inlet may comprise nozzles and/or a sparger, such that the carrier gas, generally laden with permeated water vapor, is split into bubbles upon entering the bubble column dehumidifier. The humid carrier gas may optionally pass through a pressurized gas chamber before passing through the nozzles and/or a sparger. The nozzles and/or sparger may be configured to release the bubbles of the carrier gas at a base of the bubble column dehumidifier. The nozzles and/or sparger may be configured to release the bubbles of the carrier gas in a range of from 33 to 67% a height of the bubble column dehumidifier.

The desalination device may further comprise a cooler comprising a cooler outlet, which outlet is configured to feed coolant through the bubble column dehumidifier, and optionally further comprises a cooler inlet, which inlet is configured to receive returning coolant from the bubble column dehumidifier, in a cooling cycle.

The bubble column dehumidifier may comprise a baffle within its walls, and/or the bubble column dehumidifier may comprises a baffle within the dehumidifier space above the extraction material, into which dehumidifier space the carrier gas from the bubble column inlet bubbles. The baffle(s), the dehumidifier space, and the extraction material may be contained within the bubble column dehumidifier wall(s).

The dehumidifier space may further comprise a vapor trap configured to be cooled downstream of the extraction material, and/or configured to be cooled upstream of the extraction material.

The desalination device my further comprise a heater, upstream of the carrier gas chamber inlet, and/or a feed pump, upstream of the carrier gas chamber inlet and optionally downstream of the heater.

The bubble column inlet may be configured to bubble the carrier gas into the bubble column dehumidifier in a direction orthogonal to gravity and/or in a direction (anti)parallel to gravity.

The carrier gas chamber outlet may led through the water feed chamber upstream of the bubble column dehumidifier, i.e., to cycle the carrier gas back through.

Inventive devices may comprise two or more of the module, arranged in series, and/or two or more of the module, arranged in parallel.

Aspects of the invention provide methods of desalinating water, the method comprising: feeding salinated water through the water feed inlet of any permutation of inventive desalination devices as described herein to the water feed chamber; passing the carrier gas in dry, cool form through the carrier gas chamber inlet and through the carrier gas chamber contacting the membrane on a surface opposite the water feed chamber to obtain a humidified gas including the carrier gas; passing the humidified gas through the bubble column dehumidifier to condense desalinated water and restoring the carrier gas to dry, cool form; recycling the carrier gas in dry, cool form to the carrier gas chamber; and collecting the desalinated water, wherein the humidified gas enters the bubble column dehumidifier through nozzles and/or a sparger configured to bubble the humidified gas through purified water.

The methods may further comprise heating the salinated water downstream of and/or within the water feed chamber, and/or pressurizing the carrier gas between the bubble column gas outlet and the carrier gas chamber.

The carrier gas may comprise air, $H_2$, He, $N_2$, and/or Ar, i.e., any mixture of largely inert gases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a schematic of single-stage MD desalination device with bubble column dehumidifier;

FIG. 5A shows an embodiment with parallel flow stage-connections; and

DETAILED DESCRIPTION OF THE PREFERRED EMBODIMENTS

Figure 1A:
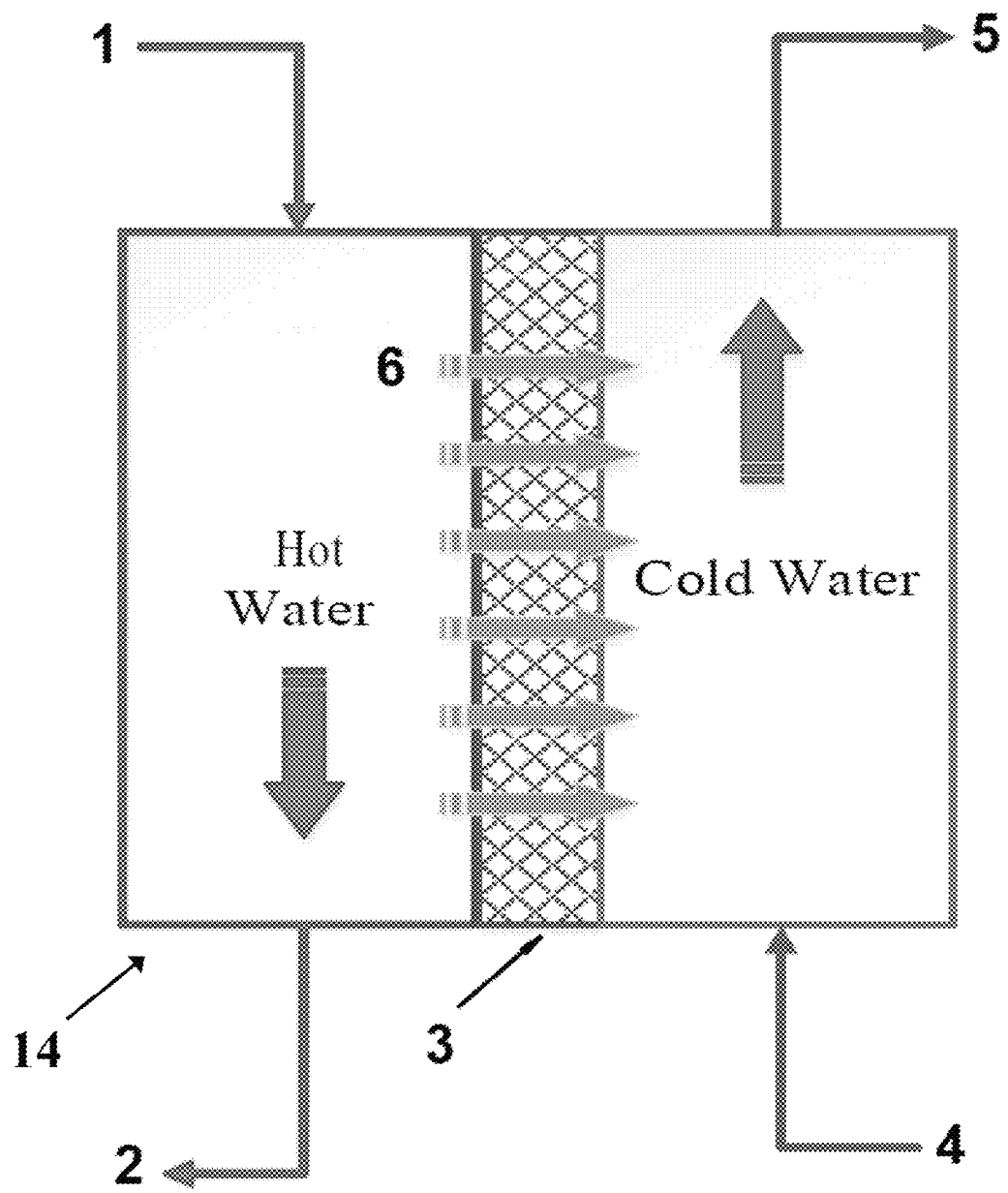
FIGS. 1A-D show four basic membrane distillation (MD) module configurations: (A) direct contact membrane distillation (DCMD), (B) air gap membrane distillation (AGMD), (C) sweeping gas membrane distillation (SGMD), and (D) vacuum membrane distillation (VMD)
Figure 1B:
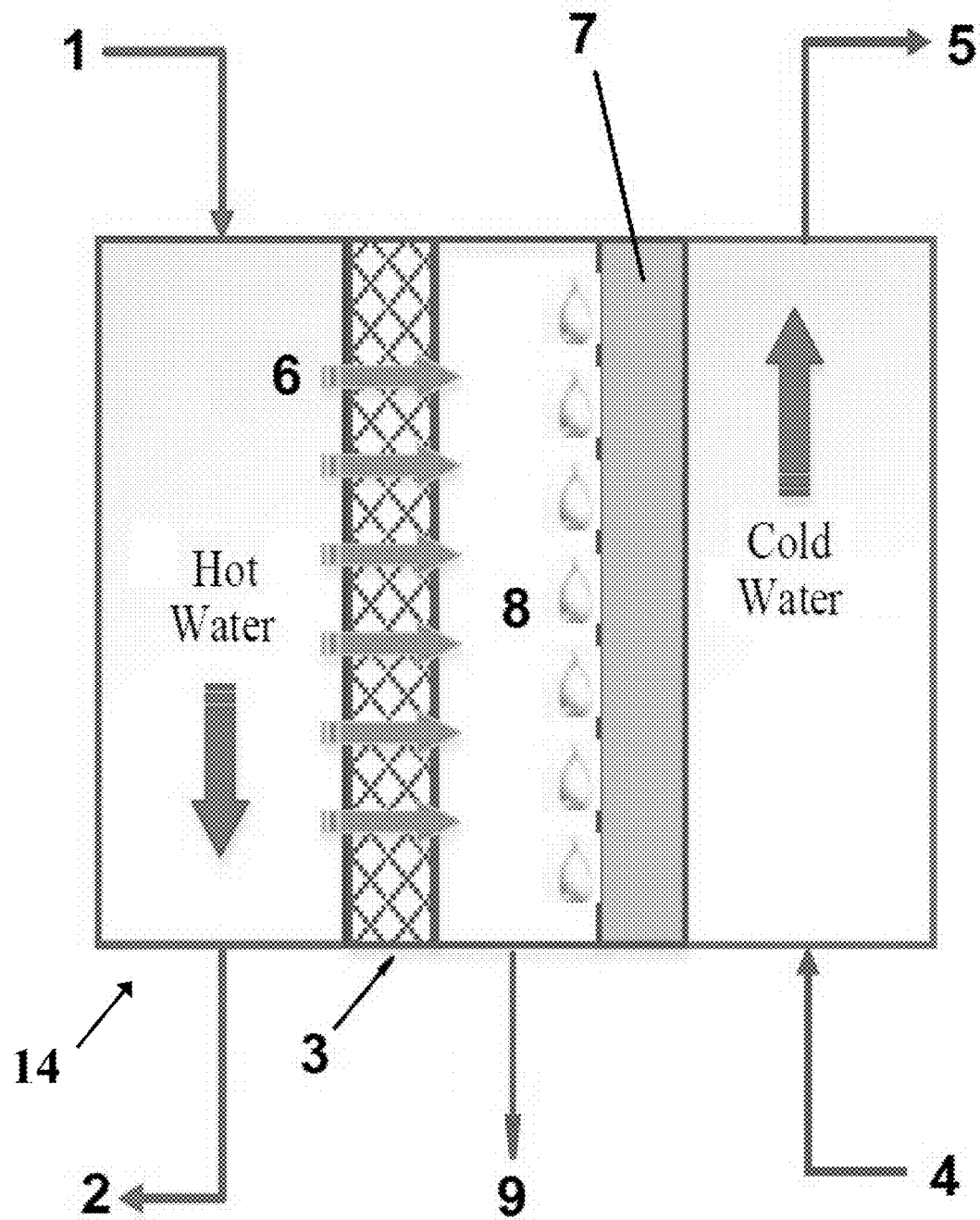
Figure 1C:
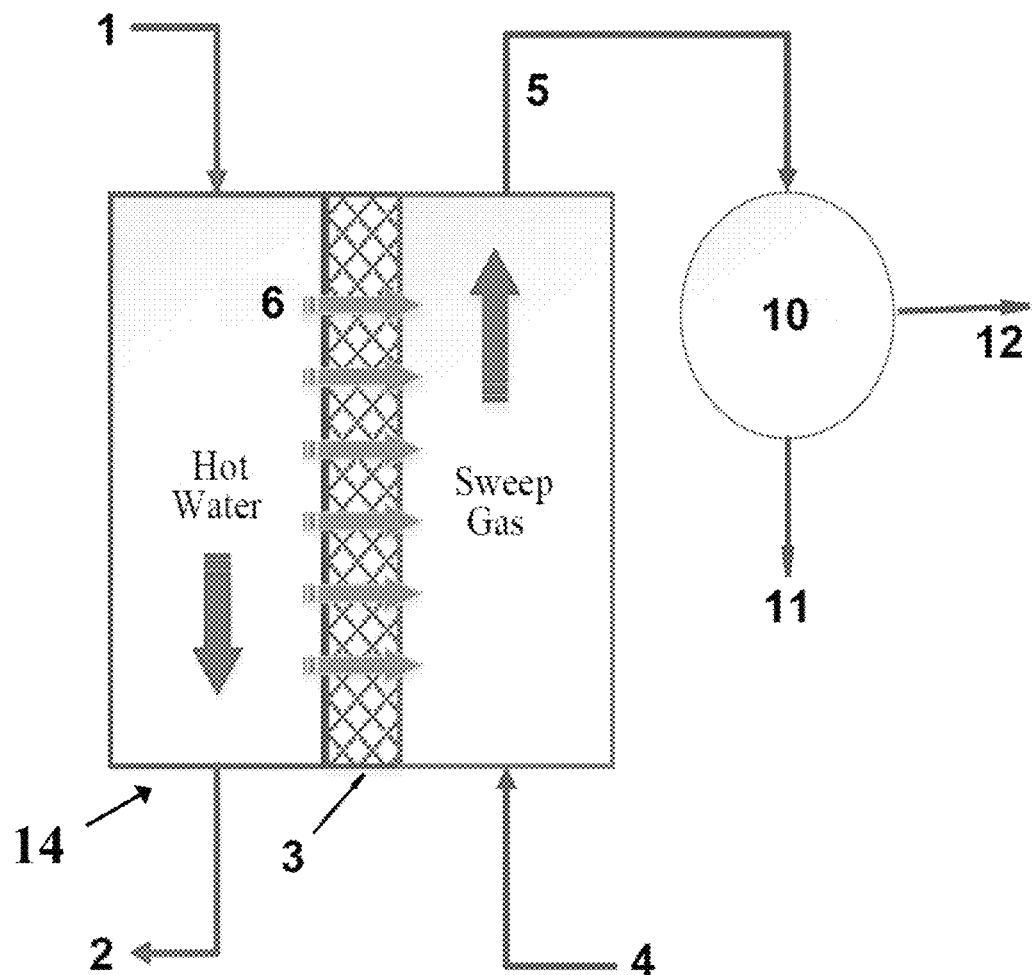
Figure 1D:
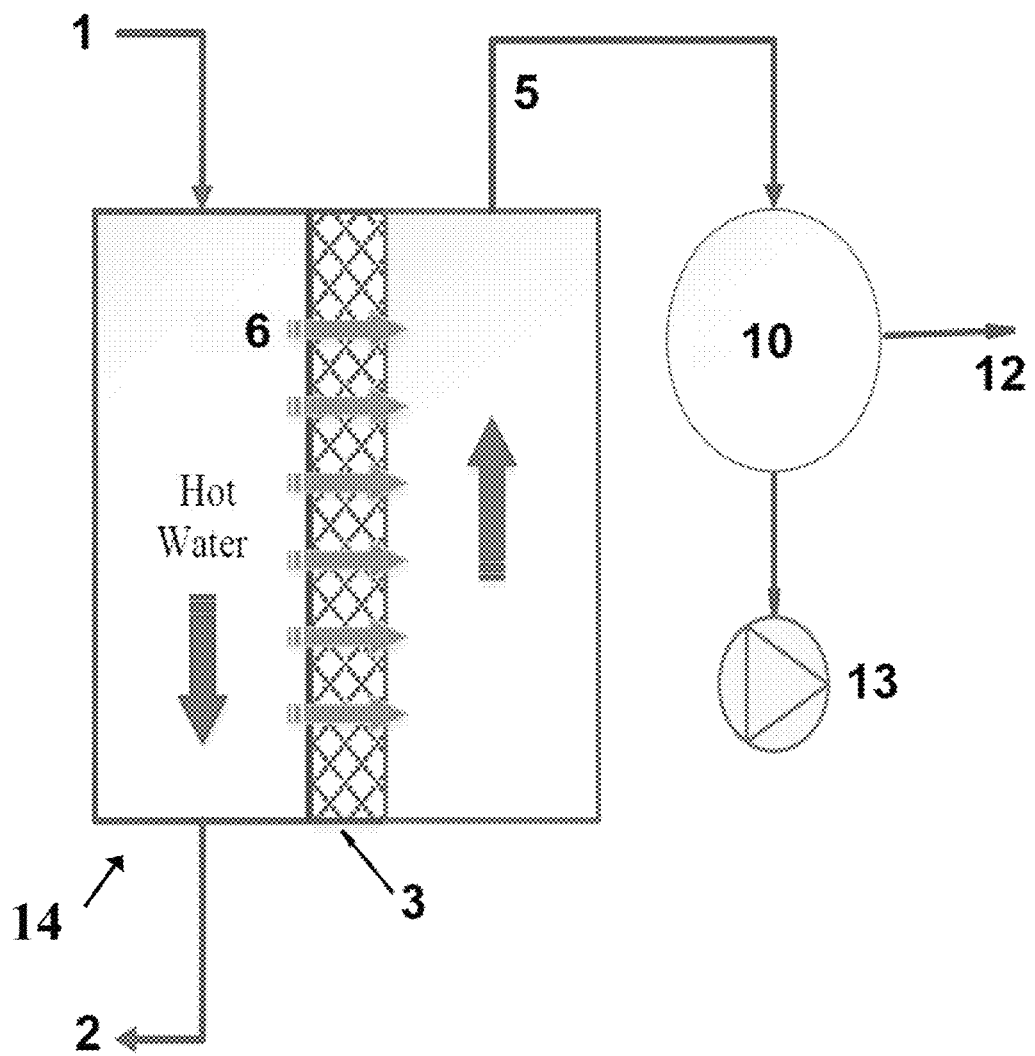

Devices within the scope of the invention can have compact design, and easy construction, high productivity and low energy consumption. Inventive systems can use a carrier gas as a vapor carrier from the MD module to the dehumidifier, reducing heat losses and increasing energy efficiency, optionally allowing complete off-grid function, particularly for high solar irradiation areas, particularly the Sahara, equatorial regions. N. Mexico, US Southwest, the Arabian Peninsula, the Arabian Gulf, Namibia/S. Africa, Chile, Western Australia, etc.

Aspects of the invention provide desalination devices, comprising a membrane distillation (MD) module, and a bubble column dehumidifier. Relevant MD modules generally comprise a water feed chamber, a carrier gas chamber, and a hydrophobic microporous membrane separating the water feed chamber and the carrier gas chamber. The hydrophobic microporous membrane will generally be a planar structure dividing prismic or half cylindrical water feed and carrier gas chambers from each other. However, the membranes may also be in the form of hoses through which, e.g., the feed water may flow and be contacted by a surrounding—outside the hose—carrier gas volume, or the opposite of this, i.e., hoses through which the carrier gas passes and collects condensate from feed water in a volume external to the hose.

Material(s) of the microporous membrane(s) may comprise polyethylene (PE), polypropylene (PP), polyethylene oxide (PEO), polystyrene (PS), polyester (e.g., polylactic acid, polyethylene terephthalate, polybutylene terephthalate, polyglycolide, poly-4-hydroxybutyrate, polyhydroxyvalerate, polyhydroxyhexanoate, polyhydroxyoctanoate, poly(ethylene 2,6-naphthalate), polytrimethylene terephthalate, polybutylene succinate, etc.), polycarbonate (PC), polyvinyl chloride (PVC), a halogenated polymer (e.g., (expanded) polytetrafluoroethylene, polyvinylidene difluoride, polyvinyl fluoride, polyvinylidene chloride, polyvinyl chloride, polychlorotrifluoroethylene, polyethylenechlorotrifluoroethylene, perfluoropropylene, perfluorinated elastomer, poly chlorotrifluoroethylenevinylidene fluoride, poly tetrafluoroethylene-propylene, perfluoropolyether, polyhexafluoropropylene, sulfonated tetrafluorethylene (co)polymer, etc.), poly(meth)acrylate poly(methyl methacrylate), poly(methyl acrylate), poly(ethyl methacrylate), poly(ethyl acrylate), etc.), acrylonitrile butadiene styrene (ABS), polyamide (PA), polyimide, styrene-butadiene rubber (SBR), styrene-ethylene/butylenes-styrene (SEBS); styrene-ethylene/propylene-styrene (SETS), ethylene-styrene interpolymer (ESI), styrene acrylate, polyetherether ketone (PEEK), polybenzimidazole (PBI), phosphoric acid based membranes, or two or more of any of these.

The pore size of the membrane may be anywhere in a range of from 10 nm to 10 μm, particularly 50 nm to 5 μm, 0.1 to 1 μm, 0.2 to 0.75 μm, 0.25 to 0.5 μm, although the upper or lower endpoints may be any of the prior or at least 25, 75, 125, 175, 225, 275, 300, 325, 350, 375, or 400 nm, and/or at most 25, 20, 15, 7.5, 2.5, 1.25, 0.9, 0.8, 0.75, 0.7, or 0.6 μm.

Membrane distillation modules of interest may be configured to allow water vapor, i.e., gaseous water, to translocate to the carrier gas chamber, but not liquid water. The membrane may have a thickness which depends upon the structure of the separation provided by the membrane and its mechanical strength requirements, but is generally in a range of from 5 to 1000, 10 to 750, 25 to 500, 40 to 400, 50 to 300, or 100 to 250 μm. The upper and/or lower endpoints of the membrane thickness may be any of the prior, or at least 1, 4, 6, 7.5, 15, 20, 33, 45, 60, 75, 85, 125, or 150 μm, and/or no more than 1250, 1125, 950, 800, 667, 600, 450, 333, or 225 μm. The porosity of useful membranes may be in the range of 0.25 to 0.99, 0.5 to 0.975, 0.60 to 0.95, 0.75 to 0.9, or at least 0.33, 0.45, 0.55, or 0.67 and/or at most 0.925, 0.875, 0.85, 0.8, 0.75, 0.7, 0.67, or 0.65.

In general, a maximum surface area should be sought to saturate the carrier gas with permeated water vapor (through the membrane), per carrier flow. The carrier gas chamber may be packed with a condensing aid, e.g., glass spheres, but may also be filled merely with carrier gas. The water feed chamber, particularly the salt-containing water therein, should generally have a higher temperature than the carrier gas chamber, which temperature difference may be at least 2.5, 5, 7.5, 10, 12.5, 15, 17.5, 20, 25, 30, 35, 40, 45, 50, 55, or 60° C., but will generally be less than 100° and often no more than 70, 60, or 50° C. The volume ratio of the water feed chamber to carrier gas chamber will generally be in a range of from 10:1 to 1:50, 5:1 to 1:25, 4:1 to 1:10, 3:1 to 1:5, 2:1 to 1:3, and may even be 1:1 in certain cases for design simplicity.

Regarding the MD modules, the water feed chamber generally comprises a water feed inlet and a water feed outlet, and a body. The water feed chamber body, generally considered the water feed chamber itself, may be prismic (e.g., triangular rectangular, e.g., square, pentagonal, hexagonal, octagonal, etc.), cylindrical, half-cylindrical, sectoral prism-shaped, spherical, sectoral sphere-shaped, pill-shaped, and/or a rounded form—shapes which may apply to the carrier gas chamber and/or the bubble column dehumidifier. The carrier gas chamber comprises a carrier gas chamber inlet, a body, and a carrier gas chamber outlet. The carrier gas chamber inlet is downstream of and connected to the bubble column dehumidifier, i.e., receiving dried carrier off-gas from the dehumidifier, and the carrier gas chamber outlet is upstream of and connected to the bubble column dehumidifier. Thus, inventive devices generally form a closed cycle with respect to the carrier gas, cycling the carrier gas through the carrier gas chamber and the bubble column dehumidifier.

Along this cycle, a gas circulation pump may intervene between the carrier gas chamber and the bubble column dehumidifier, which array be the only intervening operational element (ignoring piping), or only one or two if one considers leading the piping through the feed water chamber in a heat exchanging manner, i.e., warming the humid carrier gas before it enters the bubble column dehumidifier. The bubble column dehumidifier accordingly may be arranged with respect to the MD module in a closed manner, particularly having no intervening operational units beyond a (carrier) gas circulation pump, ignoring series MD modules, but preferably having no more than one heat exchanger for the humid carrier gas.

Relevant bubble column dehumidifiers generally comprise a bubble column inlet, an extraction material into which carrier gas from the bubble column inlet bubbles, a dehumidifier space above the extraction material, a bubble column gas outlet, and a product outlet. The temperature of the bubble column dehumidifier(s) should generally be at least 5, 10, 15, 20, 25, 30, 35, 40, 50, 60, 65, 70, 75, or 85° C. lower than the carrier gas chamber. The extraction material may preferably be deionized and/or distilled water or otherwise purified water, though the extraction material may be an immiscible, heavy (relative to water) solvent, which nonetheless drives water out of the carrier gas and allows the extracted water to permeate out as desalinated water, which, as necessary, may be subject to post-separation/permeation treatment, such as distillation. Examples of such solvents may include toluene, chloroform, dichloromethane, xylene, and the like. Also possible could be the use of immiscible light solvents, such as diethyl ether, ethyl acetate, pentane, pet ethers, MEK, cyclohexane, etc., which would allow for the placement of the permeate at the base of the bubble column dehumidifier. Still further, the extraction material may be a liquid in which water is soluble (thus generally necessitating a subsequent separative step, such as distillation, preferably in a cycle to restore the purified extraction material to the bubble column dehumidifier). Examples of such miscible extraction materials include ethanol, methanol, isopropanol, dimethylsulfoxide, acetonitrile, acetic acid, acetone, THF, dioxane, or the like, or mixtures of these.

The bubble column inlet may comprise nozzles and/or a sparger, such that the carrier gas, generally laden with permeated water vapor ("humid"), is split into bubbles upon entering the extraction material of the bubble column dehumidifier. The humid carrier gas may optionally pass through a pressurized gas chamber before passing through the nozzles and/or a sparger. The nozzles and/or sparger may be configured to release the bubbles of the carrier gas at a base of the bubble column dehumidifier. The nozzles and/or sparger may be configured to release the bubbles of the carrier gas in a range of from 5 to 90, 10 to 75, 15 to 67, 20 to 60, 25 to 55, 33 to 50% a height of the extraction material in the bubble column dehumidifier. In an embodiment the full height of the extraction material (preferably water) in the bubble column is used to release the bubbles of the carrier gas.

Useful spargers may take the form of bars, grids, (concentric) rings, spherical ends of 3D hub-and-spoke form. The bubbling may further or alternatively be occasioned by arrays of nozzles, or by passage through arrays of one-way passages/holes in a plate, cylinder, cubic, spherical, or hemispheric structure configured to contact the extraction material at least along the points of emission of the humid carrier gas into the extraction material.

A humidifier volume above the extraction material may constitute a volume ratio, relative to the extraction material volume, in a range of from 1:6 to 10:1, 1:5 to 8:1, 1:4 to 6:1, 1:3 to 4:1, or 1:2 to 3:1.

The desalination device may further comprise a cooler comprising a cooler outlet, which outlet is configured to feed coolant through the bubble column dehumidifier, and optionally further comprises a cooler inlet, which inlet is configured to receive returning coolant from the bubble column dehumidifier, in a cooling cycle. The cooler may be a device powered by, e.g., solar energy or a combustion engine, or the cooler may be a throughput of a relatively cool fluid, such as atmospheric air, or oceanic water, or ground water. In the case of environmental sources of cooling, it is conceivable that no "return" of the cooling fluid would be necessary to the "cooler," in the sense of chemical recycling.

The bubble column dehumidifier may comprise a baffle within its walls positioned in the extraction material, and/or the bubble column dehumidifier may comprise a baffle within the dehumidifier space above the extraction material. The baffles may serve to disperse bubbles within the extraction material and/or function to demist the dehumidifier space above the extraction material. The number of baffles in the extraction material will correspond to the total volume and shape of the bubble column dehumidifier, but may be in a range of, for example, 2 to 10, 3 to 8, or 4 to 6, and the baffles may be oriented vertically (parallel) to gravity, 30° diagonal to gravity, 45° diagonal to gravity, and/or orthogonal to gravity, and the baffles must not be planar, but may also or alternatively be wavy, zigzag, and/or irregularly formed.

The orientation of the baffles generally depends on the direction of bubbling into the bubble column dehumidifier, e.g., a side-ways injection may call for plate baffles orthogonal to gray i.e., in a pattern or steps that alternately direct a gas flow in opposite directions laterally at each successive step or platform. The baffle(s) the dehumidifier space, and the extraction material should generally be contained within the bubble column dehumidifier wall(s). The bubble column inlet may be configured to bubble the carrier gas into the bubble column dehumidifier 30°, 45°, 60°, in a direction orthogonal to gravity, 120°, 135°, 150°, and/or in a direction (anti)parallel to gravity.

The dehumidifier space may further comprise a vapor trap configured to be cooled downstream and/or upstream of the extraction material. The number of vapor traps s only dependent upon the shape and volume of the dehumidifier space, but may be 1, 2, 3, 4, 5, 6, 7, 8, 9, 10, or more.

The desalination device my further comprise a heater, upstream of the carrier gas chamber inlet (and/or upon the carrier gas chamber), and/or a feed pump, upstream of the carrier gas chamber inlet and optionally downstream of the heater. The heater, which may be a combination of several elements, may be combustion driven, electric, and/or solar-heated, and/or solar photovoltaic.

The carrier gas chamber outlet may led through the water feed chamber upstream of the bubble column dehumidifier, i.e., to cycle the carrier gas back through, to pre-heat the humid gas before the dehumidifier for enhanced efficiency. Inventive devices may comprise 2, 3, 4, 5, 6, 7, 10, 15, 20, or more of any MD modules described, arranged in series, and/or 2, 3, 4, 5, 6, 7, 10, 15, 20, or more of any MD modules described herein, arranged in parallel. Moreover, inventive devices may comprise 2, 3, 4, 5, 6, 7, 10, 15, 20, or more of any of the bubble column dehumidifiers as described herein, optionally each being identical to each other.

Aspects of the invention provide methods of desalinating water comprising contacting saline water, e.g., brine, brackish, and/or sea water with any device described herein. The waste stream would be more saline water and the product would be desalinated or less saline water. Typical methods involve: feeding saline water through the water feed inlet of any permutation of inventive desalination devices as described herein to the water feed chamber; passing the carrier gas in dry, cool form—generally from the bubble column dehumidifier off gas—through the carrier gas chamber inlet and through the carrier gas chamber contacting the membrane on a surface opposite the water feed chamber to obtain a humidified gas including the carrier gas; passing the humidified gas through the bubble column dehumidifier to condense desalinated water and restoring the carrier gas to dry, cool form; recycling the carrier gas in dry, cool form to the carrier gas chamber; and collecting the desalinated water, wherein the humidified gas enters the bubble column dehumidifier through nozzles and/or a sparger configured to bubble the humidified gas through purified water.

The methods may further comprise heating the saline water downstream of and/or within the water feed chamber. Inventive methods may also or alternatively pressurize the carrier gas between the bubble column gas outlet and the carrier gas chamber.

The carrier gas may comprise air, $H_2$, He, $N_2$, and/or Ar, i.e., any mixture of largely inert gases. Accordingly devices as claimed may include one or more gas tanks and/or air compressors, and optionally one or more pressure swing adsorbers (if purified carrier gas is needed for the system). Methods and, devices within the invention are capable of removing 90, 95, 99, 99.9, or 99.999% of salt on one cycle, particularly leaving only trace amounts of salt, e.g., no more than 100, 50, 25, 10, or 5 ppm of various salts, particularly NaCl.

In general, the effectiveness of the bubble column dehumidifier depends on the feed water temperature, extraction material column height (and cross-sectional contact area with bubbles), number and size of injection nozzles (or sparger design), injection pressure, and the distribution of the bubbles in the water column. Useful extraction material column heights may be at least 0.1, 0.25, 0.5, 0.75, 1, 1.5, 2.5, 3, 4, or 5 m (or more), while diameters widths may be in a range of 25 to 75, 33 to 67, or 45 to 55% of the height. Useful injection pressures may be at least 1.1, 1.25, 1.5, 1.75, 2, 2.5, 3, 4, 5, 7.5, 10, 12.5, 15, 20, 25, 30, 35, 40, or 50 bar-a, and/or no more than 200, 175, 150, 125, or 100 bar-a, though the pressure will depend upon pipe strength and injection direction. Heights and pressures can be tailored according to the form of the dehumidifier.

Provided is flux-enhanced and low energy consumption water desalination device comprising a membrane distillation (MD) module and bubble column dehumidifier generally operating in a closed cycle. A carrier gas, which may be a mixture, may be circulated in a closed cycle between the MD module and the dehumidifier and used as vapor carrier. The carrier gas can carry, i.e., take up in its volume and flow, vapor permeated through the membrane and delivers it to the bubble column dehumidifier for condensation. The carrier gas may be air, hydrogen, nitrogen, helium, and/or other gases, particularly air. The MD module may contain a hydrophobic microporous membrane in contact with the hot (at least 25, 30, 35, 40, 45, 50, 60, 75, 85, 90, 95, or 98° C.) feed water from one side (hot side) to separate the water vapor from the saline feed solution. The device may take the form of a flat sheet channeled MD module as well as the other types of MD modules equipped with hydrophobic microporous membrane, such as hollow fibers and spiral wound modules. A cold (less than 50, 40, 35, 30, 25, 20, 15, or 10° C.) and dry (less than 20, 15, 10, 5, 4, 3, 2, 1, 0.5, 0.1, or 0.001% humidity) carrier gas stream may be passed over the permeate side of the membrane to early the permeated vapor.

The flow of the cold and dry carrier gas in the post-membrane inlet, i.e., condensation chamber inlet, of the membrane module reduces the heat loss across the membrane due to the low thermal conductivity of the carrier gas, particularly air, and consequently reduces the cooling energy required for the dehumidifier. Using air or similar carrier gas in the cold permeate side of the membrane can maintain a high temperature difference across the membrane to produce high vapor pressure difference for vapor permeation across the membrane. The carrier gas motion flow in the passage behind the membrane, i.e., in the carrier gas chamber enhances the heat and mass transfer characteristics to increase the permeate flux output. In addition, it keeps lower pressure behind the membrane (due to the air pump suction) and continuously scavenge the permeated water vapor from the MD module to the dehumidifier. Air speed in the MD passage should be optimized for maximum flux output. The carrier gas generally leaves the MD module in warm and humid state. An air circulation pump may be used to urge the humid air through small nozzles, using a sparger or perforated chamber, into a bubble column dehumidifier for vapor condensation.

The bubble column dehumidifier can provide an effective condensation process, with effectiveness typically above 75, 85, 90, 95, 96, 97, 98, 99, 99.5, 99.9, or even 99.99%, with small size and low cooling energy relative to systems described in the background. The dehumidifier may contain a column of extraction material, such as cold distilled water, and the temperature of the extraction material may be maintained low by a submerged cooling coil connected to a cooling device or a cool fluid source, for example. Bubbles are formed in the dehumidifier and condensation of permeated vapor takes place as the bubbles travel through the extraction material (e.g., water) column of the dehumidifier. Air or other carrier gases may leave the dehumidifier in dry and cold state, almost with the same temperature of the water column in the dehumidifier, and return to the MD module in a closed cycle. Condensed vapor may collected as purified water above a set water level in the dehumidifier.

The number and size of injection nozzles and/or sparger holes are configured and designed to optimize bubble formation and maximize the dehumidifier effectiveness, i.e., vapor extraction from the carrier gas. Injection pressure of the humid air into the dehumidifier and the height of the water column in the dehumidifier may be optimized for maximum effectiveness. Humid carrier gas (e.g., air) injected into dehumidifier from the bottom of dehumidifier requires minimum injection pressure and suitable water column. The carrier gas (e.g., air) may be injected downward, i.e., parallel to gravity, from an elevated position in the water column to allow more contact time between the bubbles and the cold water. Injection pressure may increase if the carrier gas (e.g., air) is injected from an upper section of extraction water column downwards.

Referring now to the drawings, wherein like reference numerals designate identical or corresponding parts throughout the several views.

FIG. 1A to D show four basic configurations of membrane distillation modules in the art, namely: direct contact membrane distillation (DCMD), air gap membrane distillation (AGMD), sweeping gas membrane distillation (SGMD), and vacuum membrane distillation (VMD). In all these MD configurations, the feed solution is in direct contact with the hydrophobic membrane. However, the permeate is condensed (and collected) differently for each continuation. In DCMD, the (hot) feed solution, having salt-containing water, is in direct contact with the hot side membrane 3 surface, heated by the feed solution, and the cold membrane surface is in direct contact with the cold permeate stream. Evaporation takes place at the feed-membrane 3 surface interface in DCMD. Due to the vapor pressure difference across the membrane, the vapor 6 is moved across the membrane 3 to the permeate stream side and condenses inside the membrane module. As discussed in the background section of this application, the main drawback of DCMD is high heat loss by conduction through the thin hydrophobic membrane.

In AGMD, a stagnant air gap 8 is introduced between the membrane 3 and a condensation surface 7 within the membrane module 14 to reduce the conduction heat loss through the membrane 3. This air gap 8 increases the efficiency of the MD process, but the vapor 6 needs to cross the air barrier 8 which represents a resistance to vapor 6 transfer, and thus reduces flux. As the width (thickness) of the air gap 8 increases, the flux decreases, which is a potential drawback of AGMD.

In SGMD design, an inert gas is used to sweep the vapor 6 at the permeate membrane 3 side to condense outside the membrane module 14. The gas barrier reduces the heat loss and enhances the mass transfer coefficient due its stream motion. The main disadvantage of SGMD is that a small volume of permeate diffuses in a large sweep gas volume, requiring a large condenser. In VMD, a pump 13 is used to create a vacuum in the permeate membrane 3 side. Condensation takes place outside the membrane module 14. The heat lost by conduction is negligible, which is an advantage, but VMD involves maintaining a vacuum.

FIG. 2 shows a schematic of a single stave MD 14 desalination device with bubble column dehumidifier 17 within the scope of the invention. The hot feed seawater flows in the feed channel (1 to 2) on the hydrophobic membrane 3 surface. The other side of the membrane is the channel of the carrier gas 15, e.g., air. The membrane 3 separates the vapor 6 from the feed saline solution to the carrier gas chamber/channel. The carrier gas 15, e.g., air, carries the vapor 6 out of the membrane module 14 to be injected into the bubble column dehumidifier 17 as warm humid air using a circulation air pump 16. In FIG. 2 the flows of the feed water and the carrier gas are generally depicted as flowing in a countercurrent manner. However, un other embodiments the feed water and carrier gas flow in the generally same direction or concurrently.

As shown in FIG. 2, pressurized humid air is injected through small nozzles, a sparger (of different shapes), or simply holes 20 in the perforated disk, into a column of cold distilled water as the extraction material 23 in the dehumidifier 17 forming bubbles 21 in the extraction material 23. The gas/vapor 6 carried by the carrier gas 15 (here, air) is condensed in the bubble column dehumidifier 17, and the carrier gas 12 leaves the dehumidifier 17 in dry and cold state. The dry and cold air 12 (and/or 15) is then injected back into the carrier gas chamber inlet 4 of the MD module 14 to continue the cycle.

The temperature of the distilled water 23 in the dehumidifier 17 is kept at low set temperature by continuous cooling using a cooling coil from the cooler 18, e.g., water chiller, or any cooling flow or cycle 19a/b. The temperature of extraction material 23 column is adjusted for carrier gas 15 and energy consumption. The condensed vapor is collected as excess distillate 24 from the dehumidifier 17 and optionally measured. The flow of the cold and dry air or other carrier gases 15 described herein in the carrier gas chamber of the MD module reduces the heat loss across the membrane due to the low thermal conductivity of the air (carrier gas 15). The flow of the carrier gas 15 enhances the vapor mass transfer, enhancing system flux. The cold dry carrier gas 15 (here, air) led through the carrier gas chamber is minimally heated by taking up a small amount of permeated vapor 6 (and its heat), and humid carrier gas is easily cooled inside the dehumidifier column 17 such that the energy required for the carrier gas can be surprisingly effectively minimized.

In a particularly preferred embodiment of the invention the bubble column dehumidifier (17) is directly mounted onto a surface of the MD module (14). In this embodiment the bubble column dehumidifier and the MD module share a common border or wall such that the condensation/carrier gas chamber outlet (shown as 5 in FIG. 2) opens directly into the chamber or mounting apparatus in which the gas inlet/nozzles/smarter (reference 20 in FIG. 2) are located. This embodiment eliminates any piping or transfer tubing between the outlet of the MD module and the inlet of the bubble column dehumidifier. In certain embodiments of the invention the border or barrier separating the MD module and the bubble column dehumidifier is the device or structure representing the gas inlet/nozzles/sparger of the bubble column dehumidifier. Gas transfer through this embodiment of the invention is accomplished with a gas circulation pump, that is mounted at the vapor outlet of the bubble column dehumidifier and functions to compress or direct flow of the dehumidified gas back to the MD module.

In still a further embodiment of the invention the MD module is directly connected to the bubble column dehumidifier as a common structure with a perforated plate/sparger plate representing the border between the two. The perforated plate/sparger plate functions to disperse bubbles of the humidified gas into the medium (23 in FIG. 2) and is preferably subject to ultrasonic vibration. The vibrating sparging plate is thus substantially more efficient at distributing and bubbling the humidified carrier vapor through the cooling medium of the bubble column dehumidifier. The inclusion of a vibrating sparge plate permits bubbling to occur efficiently even at low gas pressure which is desirable in order to maintain efficient operation of the MD module. In these embodiments of the invention the end of the module and the bubble column dehumidifier are arranged as a single monolithic unit further improving the compactness and efficiency of the desalination device.

The bubble column dehumidifier 17, as exemplified in FIGS. 2 to 5, may provide an effective carrier gas 15 process (effectiveness typically above 95, 96, 97, 98, or 99%) with relatively small size and low power draw for cooling. A multistage MD 14 system can be designed with one dehumidifier for reduced size and cost, higher flux, and lower energy consumption, though more dehumidifiers 17 are not excluded. In some embodiments the feed water heater 25 can be coupled to a heat source such as a combustion heater, an electric heater, a solar (e.g., thermal and/or photovoltaic) heater, and/or a waste energy source. The extraction material 23 in the dehumidifier 17 can likewise be cooled by an electric, solar, and/or combustion powered devices or by low temperature water supply.

FIG. 3 shows different arrangements which may improve the effectiveness of the dehumidifier 17. In FIG. 3A, the humid carrier gas 15 is injected from small nozzles 20 (or a sparger of different shapes/designs) at the bottom of the dehumidifier 17 such that the water column (extraction material 23) is filled with small bubbles 21 travelling from the bottom through the column 23 upward to condense the vapor 6, and dry carrier gas 12 and/or 15 (e.g., air) is collected from the top of dehumidifier. In FIG. 3B, the humid carrier gas 15 is injected 20 at the middle of the column of extraction material 23 (e.g., water) of the dehumidifier 17 in downward direction such that the injection pressure is utilized to push the bubbles 21 a distance downward before the bubbles 21 reverse their direction and move upward again. The design in FIG. 3B may allow more contact time and longer travel distance for the vapor bubbles 21 in the column of condensing, extraction material 23 (e.g., water), and improve the dehumidifier effectiveness. Maximizing bubble contact surface and time can aid system efficiency.

Figure 3A:
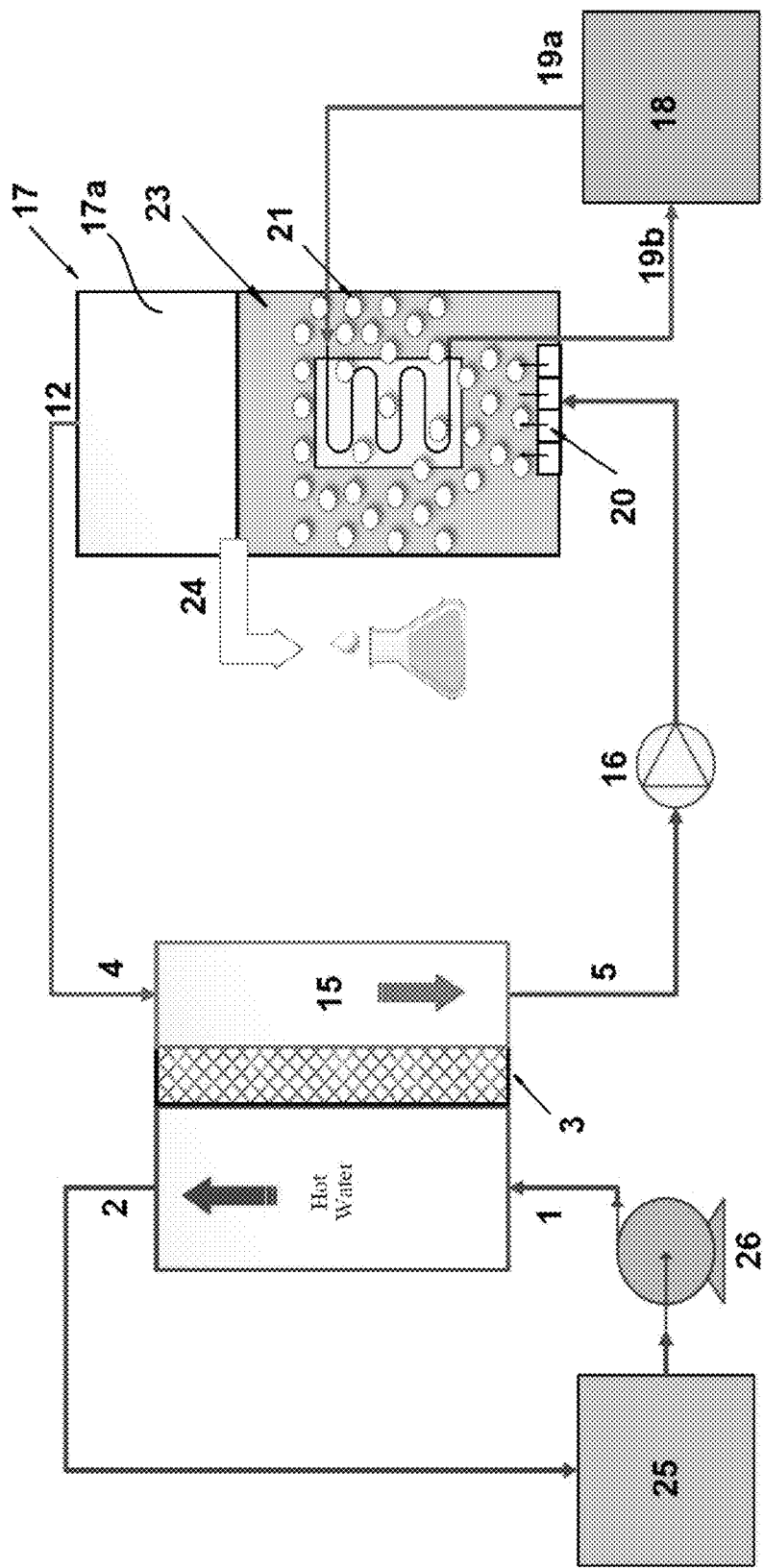
FIG. 3A shows an embodiment of a dehumidifier device and process arrangement within the scope of the invention.
Figure 3B:
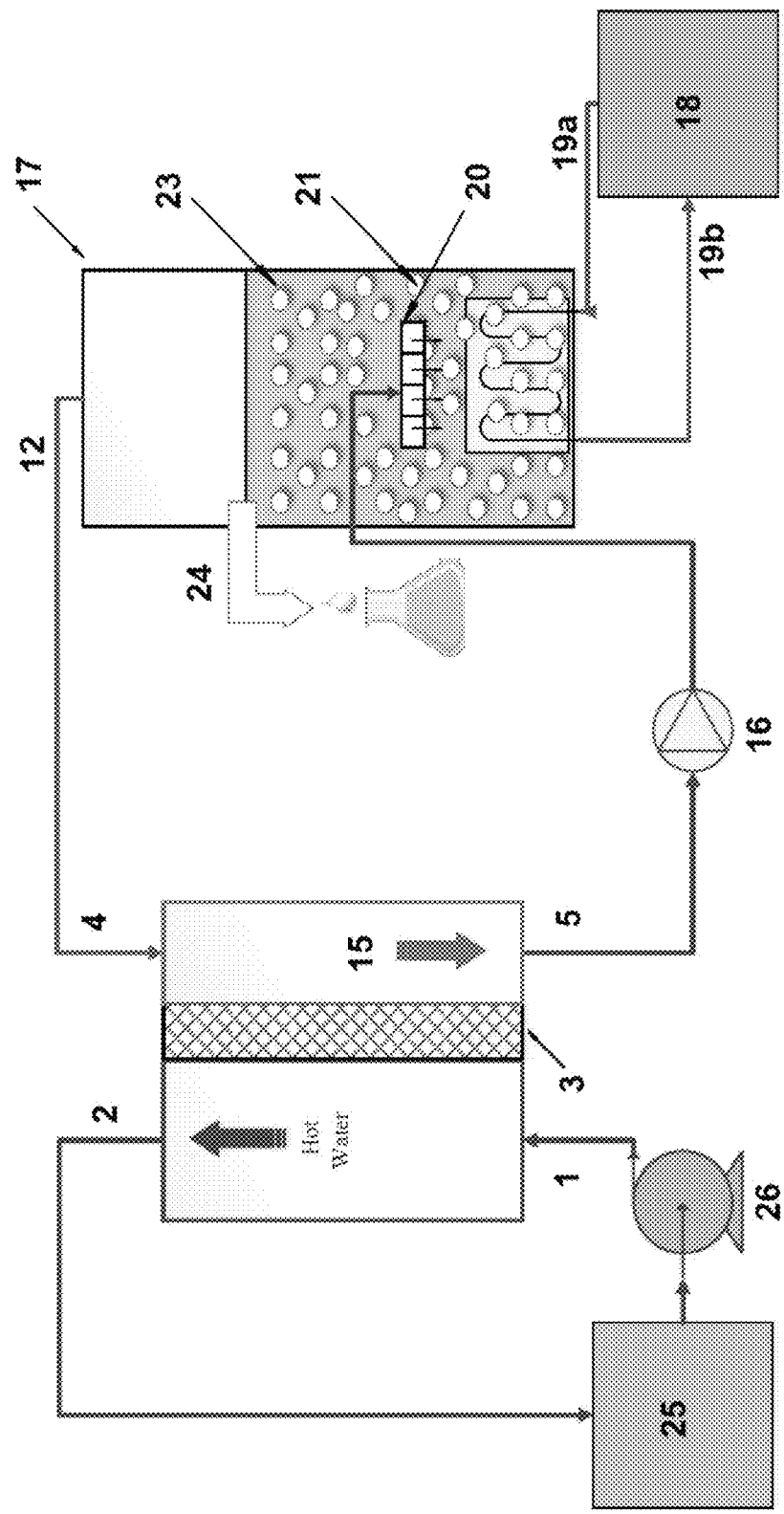
FIG. 3B shows a further embodiment of a dehumidifier device and process arrangement within the scope of the invention.
Figure 3C:
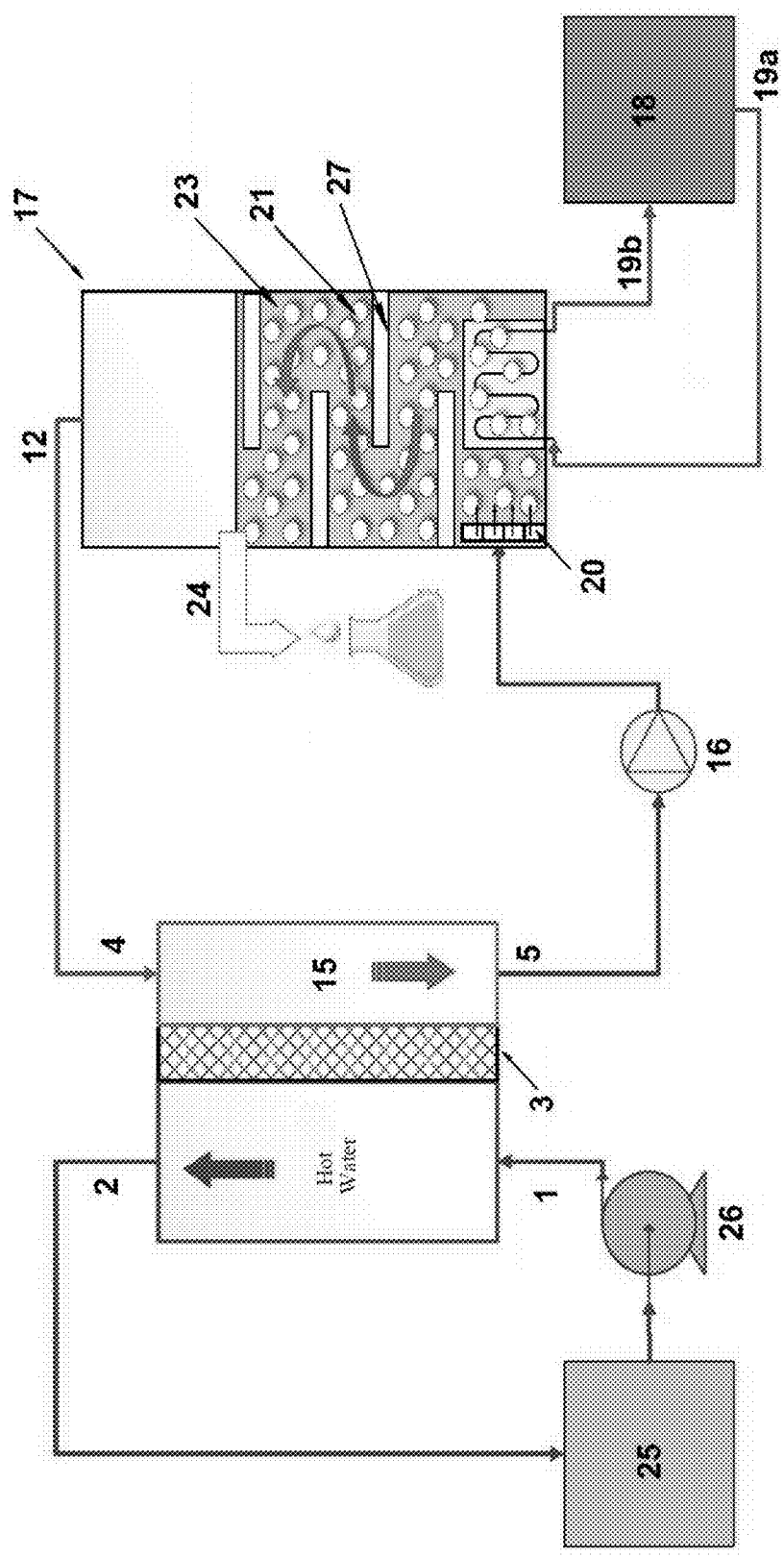
FIG. 3C shows a further embodiment of a dehumidifier device and process arrangement within the scope of the invention.

In FIG. 3C, the humid carrier gas 15 (e.g., air) may be injected 20 from the side of the dehumidifier 17 such that the vapor bubbles 21 move across the dehumidifier 17 bottom section, e.g., from left to right, radially inward, or radially outward (not shown), and the cooling coil may be aligned in the same direction. Baffles 27 may be used to direct the bubbles 21 from left to right and from right to left to increase the contact time, travel distance, turbulence, and heat and mass transfer coefficients between the bubbles 21 and the extraction material. This may enhance process effectiveness. Moreover, the baffles 27 themselves can be used as cooling surfaces inside the dehumidifier 17, and this may aid in multistage designs where more intensive cooling is required for small sized dehumidifier 17.

Figure 3D:
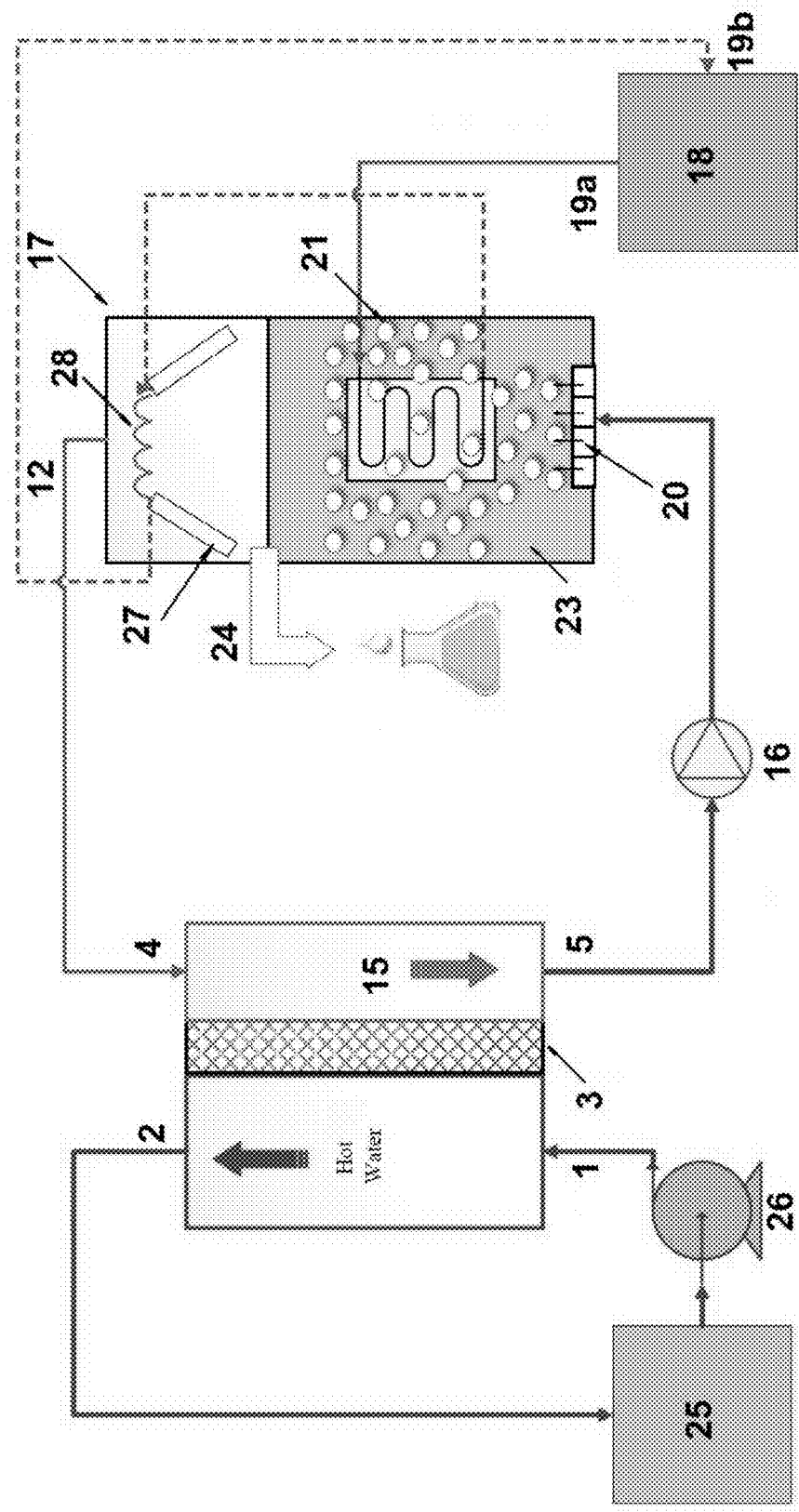
FIG. 3D shows a further embodiment of a dehumidifier device and process arrangement within the scope of the invention.

In FIG. 3D, a modified bubble column dehumidifier 17 with guiding baffles 27 and vapor trap coil 28 is illustrated to catch the escaping vapor 6, if any, from the extraction material 23/condensation column in the dehumidifier 17. The guiding baffles 27 can direct the carrier gas 12 and/or 15 (e.g., air) leaving the column of extraction material 23 to one or more cold coils 28 (vapor traps) to maximize condensation of the vapor 6 in the carrier gas 15 before leaving the dehumidifier 17. The cold coil 28 may be connected to the cooler line 19b entering the dehumidifier 17, particularly the dehumidifier volume space 17a, such that no additional system components are needed and the small system size is preserved.

Figure 4:
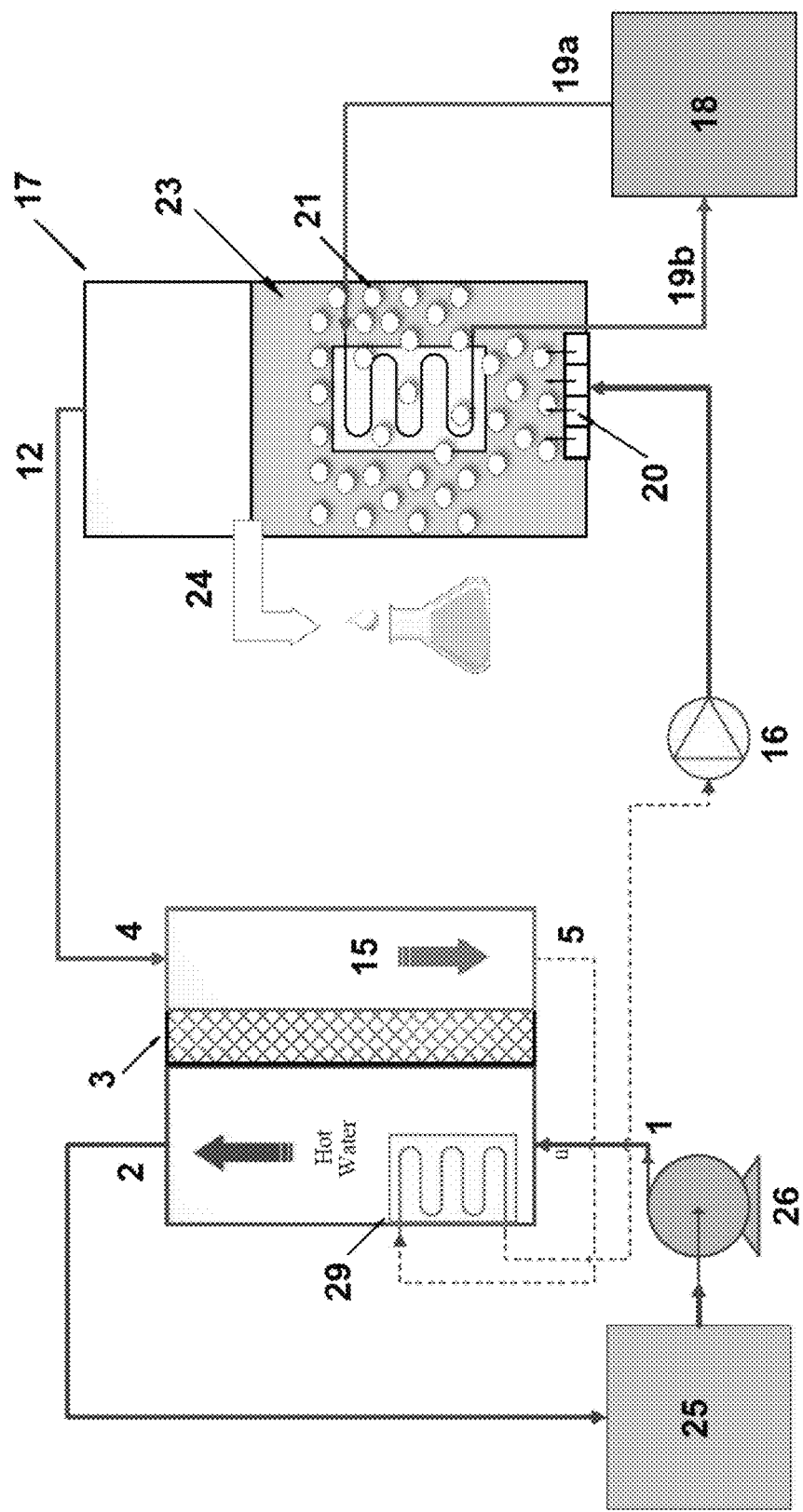
FIG. 4 shows humid air preheating before entering the dehumidifier.

FIG. 4 shows a measure to increase the system output flux. In this embodiment, the hot feed channel is used as a heat exchanger to preheat the humid air leaving the MD module. Increasing the temperature of the humid air before entering the dehumidifier enhances the condensation process and the dehumidifier effectiveness, at the expense of an additional small amount of cooling energy to keep the temperature of the water column in the dehumidifier at the set point.

Figure 5B:
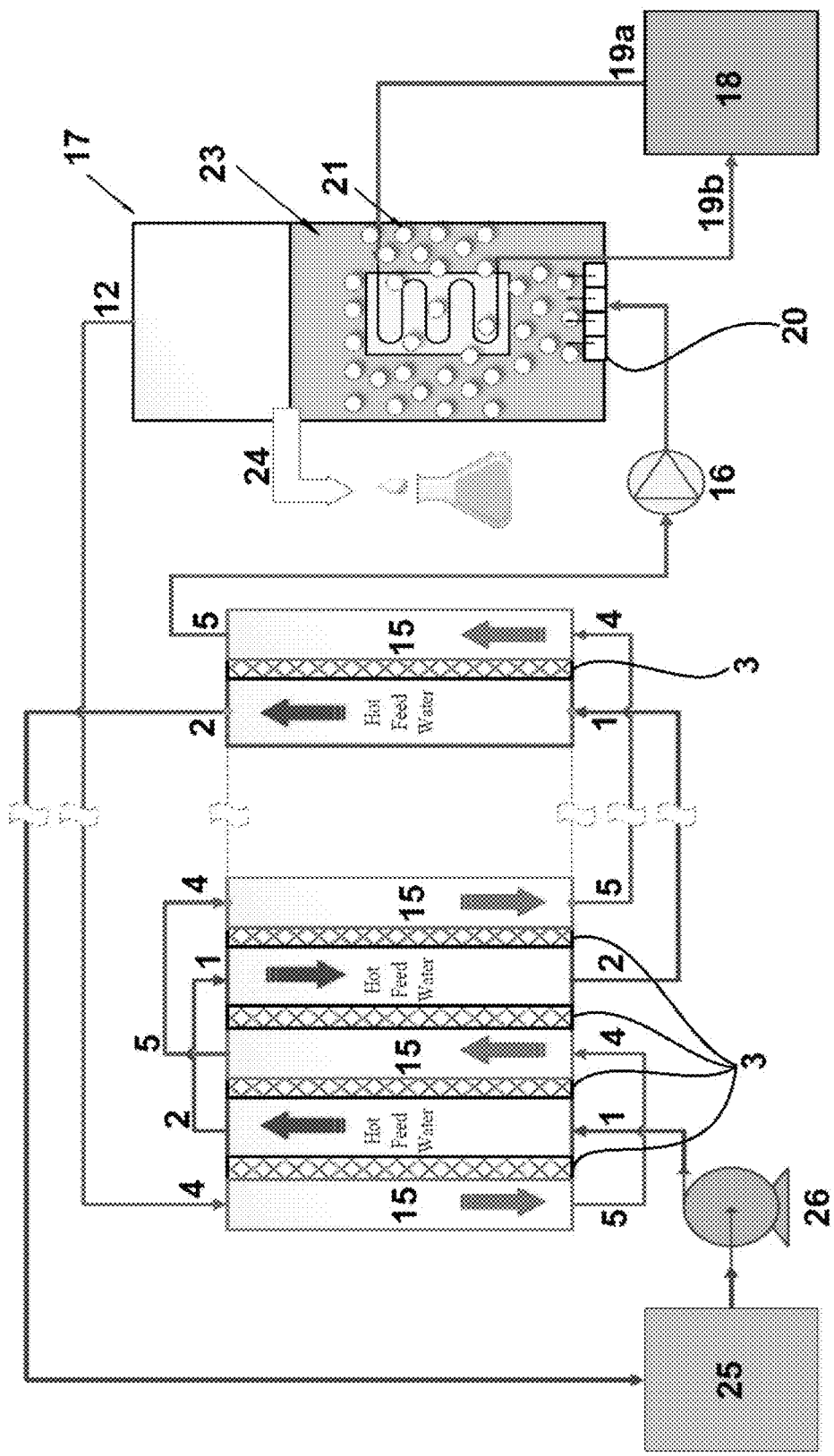
FIG. 5B shows an embodiment with series flow stages-connections.

FIGS. 5A and B show possible multistage designs for parallel (FIG. 5A) and series (FIG. 5B) flow stages connections. Efficient utilization of energy is achieved by multistage membrane distillation designs using inventive devices. The membrane module 14 is designed to be compact and has n-stages such that feed water 1/2 can be supplied in parallel to all stages or in series from stage to another. In FIGS. 5A and B, each carrier gas passage 4/5 may be separating two membranes 3 for design compactness and to enable more membranes 3 (stages) for more output permeate flux, and to minimize the thermal variations inside the module. The feed water 1/2 may be pumped 26 from the heating bath to the module 14 stages, e.g., in parallel, series, or even mixed stages-flow arrangements, and the (carrier) gas 15 circulation pump 16 can inject the cold dry carrier gas 15 into the carrier gas chambers/passages. The two cycles of feed water and carrier gas 15 may be separate and closed. One dehumidifier 17 may be sufficient for a multistage MD module 14 since the heat removed by the carrier gas 15 streams from the MD module 14 is low, at least in part due to thermal properties, such as low thermal conductivity, of the carrier gas 15, esp. air. The size of the dehumidifier 17 is determined based on the number of module 14 stages and the maximum operating feed temperature. The flow of feed water and air streams inside the stages of the MD module 14 can be parallel or counter as seen in FIG. 5B. The width of the carrier gas 4/5 passage and the carrier 15 gas speed may be controlled in the detailed design.

Numerous modifications and variations of the present invention are possible in light of the above teachings. It is therefore to be understood that within the scope of the appended claims, the invention may be practiced otherwise than as specifically described herein.

REFERENCE SIGNS 1 feed inlet
2 feed outlet
3 membrane
4 carrier gas chamber inlet (post-membrane inlet) or permeate collection inlet in FIG. 1A-D
5 carrier gas chamber outlet (post-membrane outlet) or permeate collection outlet in FIG. 1A-D
6 vapor
7 condensation plate
8 air gap
9 air gap product
10 condenser
11 condenser product
12 condenser gas outlet
13 vacuum pump
14 membrane distillation (MD) module
15 post-membrane carrier gas
16 gas circulation pump
17 bubble column dehumidifier
17a dehumidifier volume/space
18 cooler
19a/b cooling material outlet (a) and inlet (b)
20 humid gas injectors/nozzles/spanker
21 bubbles
22 pressurized humid gas
23 purified cold water cool extraction material
24 permeate outlet
25 feed water heater
26 feed pump
27 baffle
28 vapor trap
29 heat exchanger

The invention claimed is:

1. A desalination device, comprising:
a membrane distillation module comprising a water feed chamber, a carrier gas chamber, and a hydrophobic microporous membrane configured to separate the water feed chamber and the carrier gas chamber; and
a bubble column dehumidifier comprising a bubble column inlet, a bubble column space defined by walls of the bubble column dehumidifier, a liquid extraction material present in the bubble column space into which carrier gas from the bubble column inlet bubbles, a dehumidifier space above the liquid extraction material, a bubble column gas outlet, and a product outlet,
wherein the bubble column further comprises a plurality of laterally overlapping plate baffles disposed on the walls of the bubble column dehumidifier and are submerged in the liquid extraction material, wherein the plate baffles are configured to alternately direct the carrier gas through the liquid extraction material in opposite directions laterally at each successive plate baffle,
wherein the membrane distillation module is configured to pass water vapor from the water feed chamber through the hydrophobic microporous membrane to the carrier gas chamber without passing liquid water from the water feed chamber to the carrier gas chamber,
wherein the water feed chamber comprises a water feed inlet and a water feed outlet,
wherein the carrier gas chamber comprises a carrier gas chamber inlet and a carrier gas chamber outlet,
wherein the carrier gas chamber outlet is upstream of and connected to the bubble column dehumidifier,
wherein the carrier gas chamber inlet is downstream of and connected to the bubble column dehumidifier so as to cycle the carrier gas through the carrier gas chamber and the bubble column dehumidifier, and
wherein the membrane distillation module and the bubble column dehumidifier form a closed cycle carrier gas operation system.

2. The device of claim 1, wherein the bubble column inlet comprises nozzles and/or a sparger, such that the carrier gas is split into bubbles upon entering the bubble column dehumidifier, optionally passing through a pressurized gas chamber before passing through the nozzles and/or a sparger.

3. The device of claim 2, wherein the nozzles and/or sparger are configured to release the bubbles of the carrier gas at a base of the bubble column dehumidifier.

4. The device of claim 2, wherein the nozzles and/or sparger are configured to release the bubbles of the carrier gas within the liquid extraction material at a height in a range of from 33 to 67% of a height of the liquid extraction material in the bubble column dehumidifier.

5. The device of claim 1, further comprising:
a cooler comprising a cooler outlet, configured to feed coolant through the bubble column dehumidifier.

6. The device of claim 5, wherein the cooler further comprises a cooler inlet, configured to receive returning coolant from the bubble column dehumidifier, in a cooling cycle.

7. The device of claim 1, wherein the bubble column dehumidifier comprises a dehumidifier baffle within the dehumidifier space above the liquid extraction material, into which the carrier gas from the bubble column inlet bubbles, the baffle, the dehumidifier space, and the liquid extraction material being within the bubble column dehumidifier.

8. The device of claim 7, wherein the dehumidifier space further comprises a vapor trap, which is configured to be cooled downstream of the liquid extraction material.

9. The device of claim 1, further comprising:
a heater, upstream of the carrier gas chamber inlet; and
a feed pump, upstream of the carrier gas chamber inlet and downstream of the heater.

10. The device of claim 1, wherein the bubble column inlet is configured to bubble the carrier gas into the bubble column dehumidifier in a direction orthogonal to gravity.

11. The device of claim 1, wherein the bubble column inlet is configured to bubble the carrier gas into the bubble column dehumidifier in a direction parallel to gravity.

12. The device of claim 1, wherein the carrier gas chamber outlet is led through the water feed chamber upstream of the bubble column dehumidifier.

13. The device of claim 1, comprising two or more of the membrane distillation modules, arranged in series.

14. The device of claim 1, comprising two or more of the membrane distillation modules, arranged in parallel.

15. A method of desalinating water, the method comprising:
- feeding saline water through the water feed inlet of the desalination device of claim 1 to the water feed chamber;
- contacting the saline water with a hydrophobic microporous membrane to separate water vapor from the saline water;
- passing the carrier gas in dry, cool form through the carrier gas chamber inlet and through the carrier gas chamber contacting the membrane on a surface opposite the water feed chamber to obtain a humidified gas including the carrier gas and the water vapor;
- passing the humidified gas through the bubble column dehumidifier to condense desalinated water and restoring the carrier gas to dry, cool form;
- recycling the carrier gas in dry, cool form to the carrier gas chamber; and
- collecting the desalinated water,
- wherein the humidified gas enters the bubble column dehumidifier through nozzles and/or a sparger configured to bubble the humidified gas through purified water.

16. The method of claim 15, further comprising:
heating the saline water downstream of and/or within the water feed chamber.

17. The method of claim 15, wherein the carrier gas comprises air, $H_2$, He, $N_2$, Ar, or a mixture of any of these.

18. The method of claim 15, further comprising:
pressurizing the carrier gas between the bubble column gas outlet and the carrier gas chamber.

* * * * *